(12) United States Patent
Jong

(10) Patent No.: US 6,269,107 B1
(45) Date of Patent: Jul. 31, 2001

(54) DEVICE AND METHOD FOR DEMULTIPLEXING TRANSPORT STREAM

(75) Inventor: Soo Gil Jong, Kyungki-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/014,404

(22) Filed: Jan. 28, 1998

(30) Foreign Application Priority Data

Feb. 5, 1997 (KR) .................................................. 97-3619

(51) Int. Cl.[7] .................................................. H04L 9/00
(52) U.S. Cl. ............................................ 370/535; 348/423
(58) Field of Search .................................. 370/535, 541; 348/423

(56) References Cited

U.S. PATENT DOCUMENTS 5,920,572 * 7/1999 Washington et al. ................ 370/535

* cited by examiner

Primary Examiner—Melvin Marcelo
(74) Attorney, Agent, or Firm—Fleshner & Kim, LLP

(57) ABSTRACT

Device and method for demultiplexing a transport stream (TS), is disclosed, which is suitable for fast processing and transmission of transport stream packets of TV signal by a fixed length transport packet unit, the device including a synchronization and fetch controller for checking a synchronization byte of a received transport stream, a first subdecoder for comparing a packet identification number of the transport stream to an individual bit stream of the packet under the control of the synchronization and fetch controller, for filtering designated packets only, a second subdecoder for extracting a program clock reference information of the transport stream under the control of the first subdecoder, a descrambler for recovering a scramble signal from payload information in the transport stream under the control of the first subdecoder or the second subdecoder, a multiplexer for multiplexing the transport stream or descrambled signal under the control of the first subdecoder and the second subdecoder, and a third subdecoder for extracting a presentation time information of the transport stream or a stream from the multiplexer and providing a control signal to the multiplexer and the descrambler, whereby decoding the transport stream in real time on arrival thereof.

20 Claims, 3 Drawing Sheets

DEVICE AND METHOD FOR DEMULTIPLEXING TRANSPORT STREAM

BACKGROUND OF THE INVENTION

1. Field of the Invention

The present invention is related to an MPEG-2 (Moving Picture Experts Group; An international standard 2 for moving picture compression in a media integrated system, hereinafter called 'MPEG-2') which multiplexes multimedia, and more particularly, to device and method for demultiplexing a transport stream (TS), which is suitable for fast processing and transmission of transport stream packets of TV signal by a fixed length transport packet unit.

2. Discussion of the Related Art

In general, the multiplexing by packets is, for example, in case of multiplexing of video and audio, is a system in which video and audio are respectively divided into appropriate lengths of bit streams called as 'packets', additional information, such as header, is attached thereto, and time-division transmitted. This time-division transmission system is applied to data compression of communication and digital DBS (Direct Broadcasting System) receiver. In a broadcasting station, a TV signal is converted into a digital TV signal, compressed, and transmitted to a satellite, the satellite receives the TV signal, amplifies, and transmits the signal trough a relay again, and the TV signal relayed through the communication satellite is received at a receiver or decoder and demodulated, thereby a program broadcasted from a broadcasting station can be watched. In this case, in the broadcasting station, video, audio and data signal are converted into digital signals, compressed, and formed into a packet stream, to provide one TV signal stream. Plural digital TV signal streams are multiplexed in a transport multiplexer into transport stream packets and provided to a channel encoder. The transport stream packets has a size of 188 byte unit and a data rate RU of approx. 40~45 Mbps.

FIG. 1 illustrates a block diagram of a background art device for demultiplexing a transport stream, showing CL9110 transport layer demultiplexer of C-Cube Co. Ltd. as an example.

Referring to FIG. 1, the background art device for demultiplexing a transport stream 10, integrated into one chip, is provided with a packet framer 11 for receiving an MPEG-2 data and re-framing into transport stream packet units, a first FIFO buffer 12 for temporary storage of the transport stream packets from the packet framer 11 in byte units, a RISC (Reduced Instruction Set Computer) engine 13 for making the packets stored in the first FIFO buffer 12 responsive to demands from devices there around, such as a program/data RAM 23 or a descrambler interface 14, a second FIFO buffer 15 for temporary storage of the packets interfaced in the RISC engine 13, and a memory controller 16 for making the packets stored in the second FIFO buffer 15 to exchange information with local DRAM (not shown) and controlling transmission of parsed bit streams to a video interface 24, audio interface 25 and high speed interface 17. There are a PCR recovery 18 for providing PCR (Program Clock Reference) information so that the packet framer 11 sets an STC (System Time Clock; reference synchronization information) as desired, a voltage control oscillator 19 for providing the STC to the PCR recovery 18, and a RC filter 20 for linear filtering the STC from the PCR recovery 18 into an oscillating signal and providing the PCR recovery 18 and the packet framer 11 through a bus line. The packet framer 11 is connected to interfaces, such as an I²C interface 21, an host interface 22, a program/data RAM 23, a video interface 24, an audio interface 25, and a high speed interface 17 through a common bus line.

When an MPEG-2 transport data is reached to the packet framer 11, the aforementioned background art device for demultiplexing a transport stream 10 has a PCR information set through the voltage control oscillator 19 and the RC filter 20 matched to timing of bytes of a bit stream carrying a PCR. And, the packet framer 11 picks up information suitable for composing a transport stream packet through bus line communication with the I²C interface 21, the host interface 22, the program/data RAM 23, the video interface 24, the audio interface 25 and the memory controller 16, which are connected with peripheral devices. The packet framer 11 then reframes MPEG-2 transport data received in bit units successively into transport stream packets to meet the requirements of the information. The reframed transport stream packet is temporarily stored in the first FIFO buffer 12, determined of its scrambling by partial decoding of the transport stream packet in the RISC engine 13, and decoded in response to a control signal from the program/data RAM 23. Then, the decoded data (video or audio information) is temporarily stored in the second FIFO buffer 15 through the RISC engine 13 and stored in the external local DRAM through the memory controller 16. The data, temporarily stored in the second FIFO buffer 15, is provided to the video interface 24 and the audio interface 25 through the bus line under the control of the memory controller 16 and presented as a video stream and a audio stream. When there are external demands for data on the transport stream packet, the transport packets composed in the packet framer 11 is provided to an external device through the high speed interface 17.

The aforementioned background art device for demultiplexing a transport stream has an advantage of enabling a program conversion due to the use of the program/data RAM, but has disadvantage in the large sized hardware with a difficulty of cost down due to provision of the FIFO buffers at input/output terminals of the RISC engine to cope with the irregular data processing rate of the RISC engine.

SUMMARY OF THE INVENTION

Accordingly, the present invention is directed to device and method for demultiplexing a transport stream that substantially obviates one or more of the problems due to limitations and disadvantages of the related art.

An object of the present invention is to provide device and method for demultiplexing a transport stream which allows a real-time decoding of the transport stream.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for demultiplexing a transport stream includes a synchronization and fetch controller for checking a synchronization byte of a received transport stream, a first subdecoder for comparing a packet identification number of the transport stream to an individual bit stream of the packet under the control of the synchronization and fetch controller, for filtering designated packets only, a second subdecoder for extracting a program clock reference information of the transport stream under the control of the first subdecoder, a descrambler for recovering a scramble signal from payload information in the transport stream under the control of the first subdecoder or the second subdecoder, a multiplexer for multiplexing the transport stream or descrambled signal under the control of the first subdecoder and the second subdecoder, and a third subdecoder for extracting a presentation time information of the transport stream or a stream from the multiplexer and providing a control signal to the multiplexer and the descrambler.

In another aspect of the present invention, there is provided a method for demultiplexing a transport stream including the steps of (1) comparing a packet identification number of a transport stream to an individual bit stream of the packet after checking a synchronization byte of the received transport stream, for extracting designated packets only, (2) extracting a program clock reference information of the transport stream and recovering a scramble signal from payload information in the transport stream packets according to information extracted in the step (1), (3) multiplexing the received transport stream or the descrambled signal according to information extracted in the steps of (1) and (2), and (4) extracting presentation time information of the received transport stream or the multiplexed stream depending on scrambled cases and controlling the multiplexing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
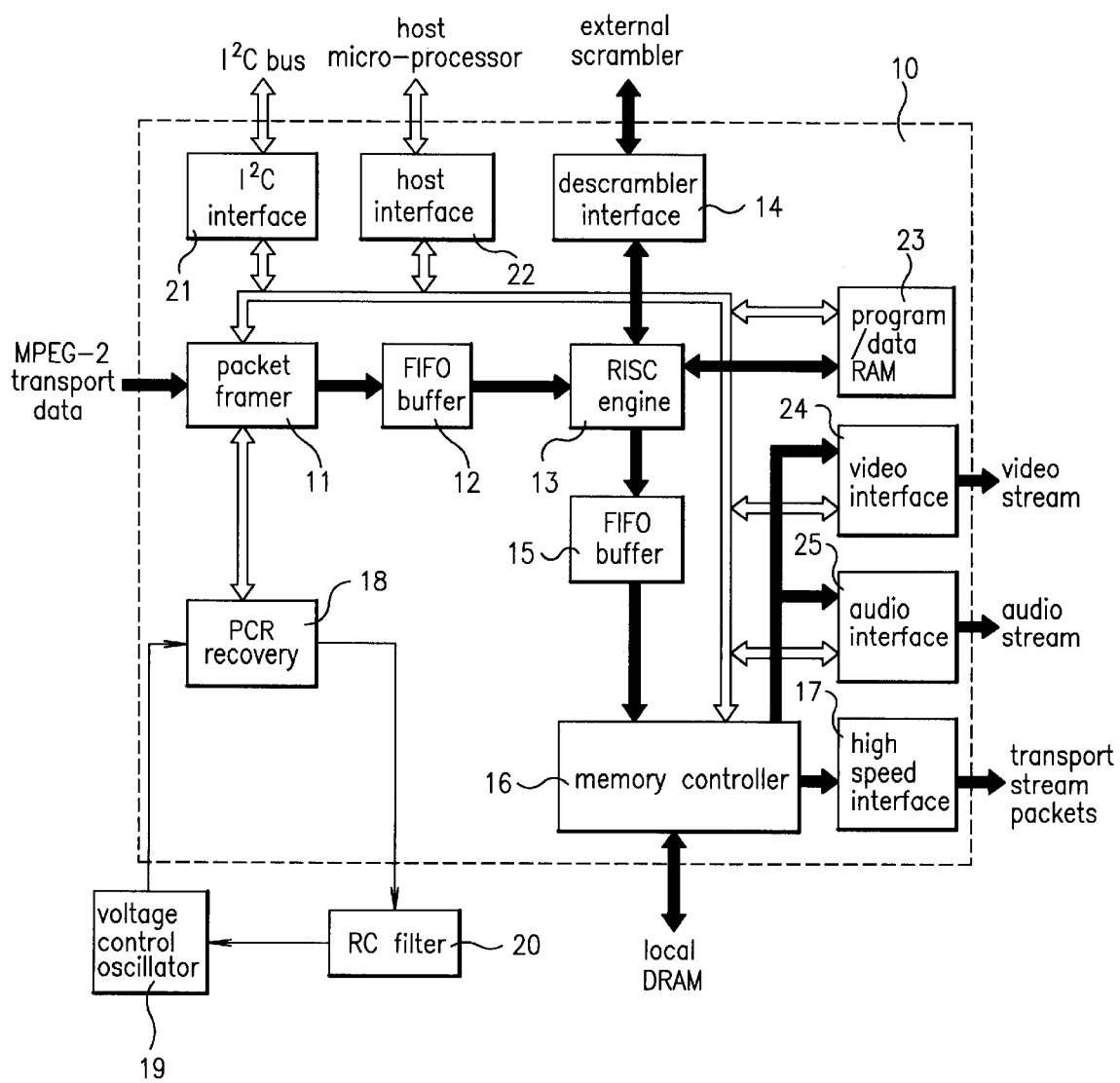
FIG. 1 illustrates a block diagram of a background art device for demultiplexing a transport stream.
Figure 2:
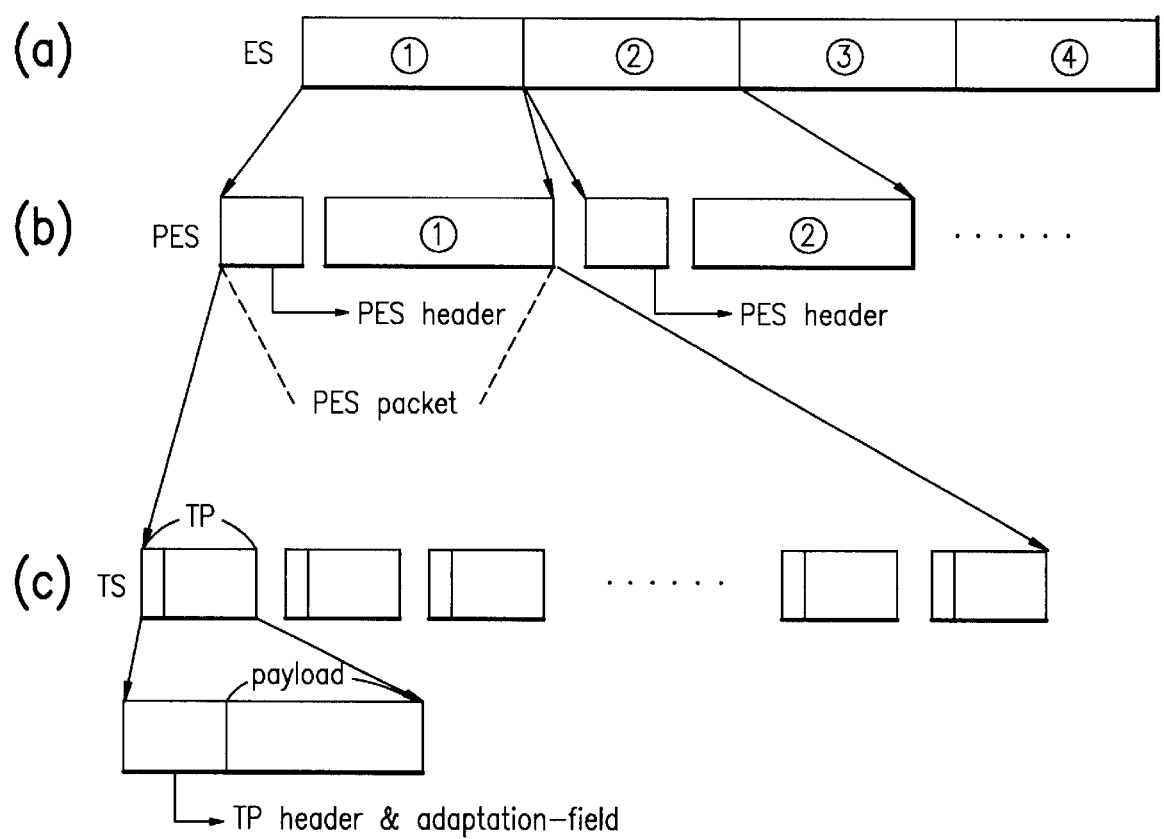
FIG. 2 illustrates a structure of a transport stream packet in accordance with a preferred embodiment of the present invention, schematically.

Reference will now be made in detail to the preferred embodiments of the present invention, examples of which are illustrated in the accompanying drawings. FIG. 2 illustrates a structure of a transport stream packet in accordance with a preferred embodiment of the present invention, schematically, and FIG. 3 illustrates a block diagram showing a device for demultiplexing a transport stream in accordance with a preferred embodiment of the present invention.

Figure 3:
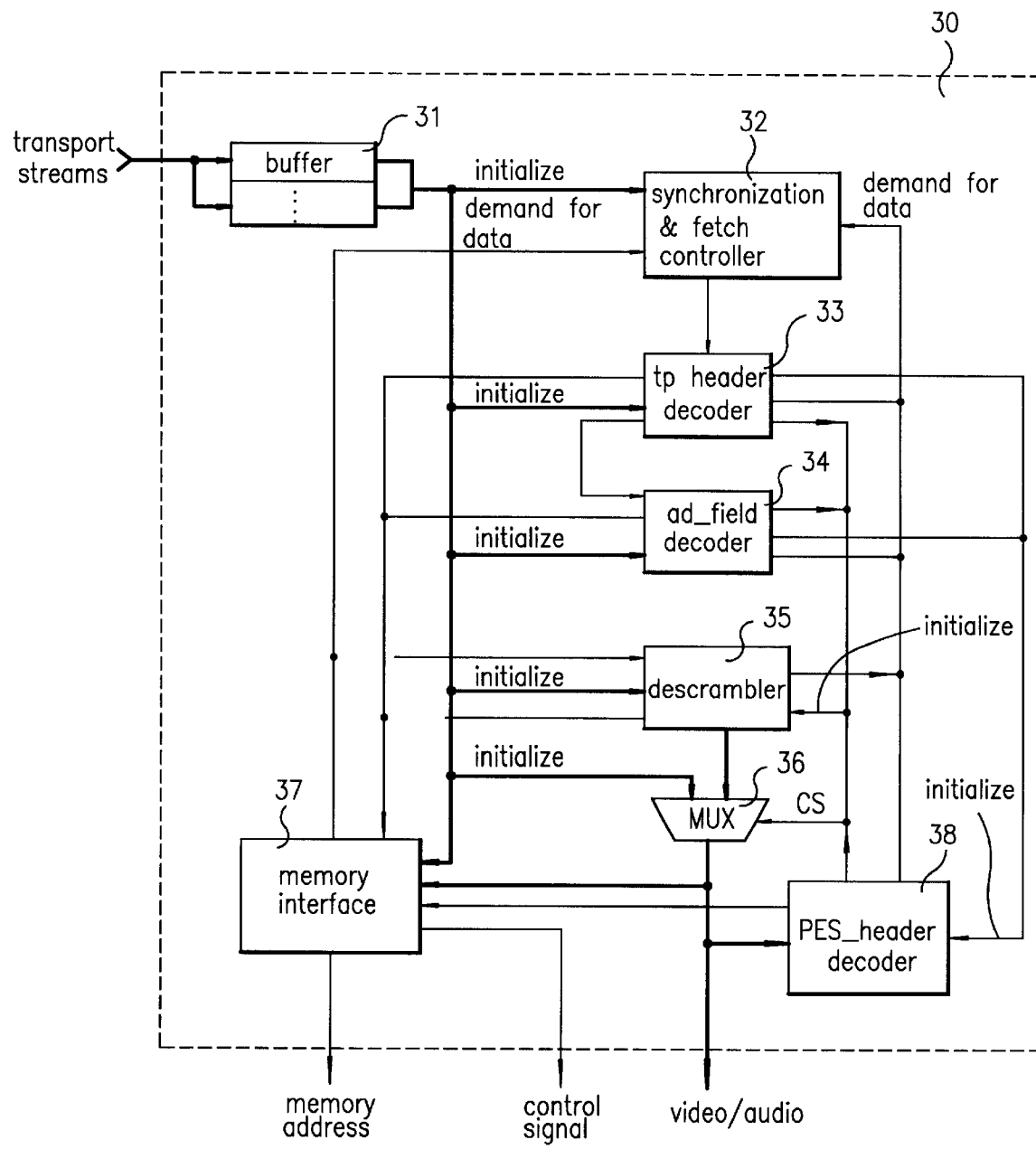
FIG. 3 illustrates a block diagram showing a device for demultiplexing a transport stream in accordance with a preferred embodiment of the present invention.

Referring to FIG. 3, the device for demultiplexing a transport stream 30 in accordance with a preferred embodiment of the present invention includes N buffers 31, a synchronization and fetch controller 32, tp_header decoder 33, ad_field decoder 34, descrambler 35, a multiplexer 36, a PES(Packetized Elementary Stream)_header decoder 38 and memory interface 37, each connected to one another through a common bus line.

The aforementioned device 30 for demultiplexing a transport stream demultiplexes a transport stream of a TV signal, of which structure will be explained with reference to FIG. 2, wherein FIG. 2a illustrates an ES (Elementary Stream) syntax, FIG. 2b illustrates a PES stream which is ES's to each of which a PES header is added to form a PES packet. As shown in FIG. 2c, each of the PES packet has a plurality of transport packets (TP) each consisting of a transport header, an apadtation_field (ad_field) and payload. To allow watch only for licensed users, the transport stream may be scrambled either at a transport level or at a PES level. The aforementioned device for demultiplexing a transport stream allows to obtain video/audio signals by removing the TP header, ad_field and PES header, and, if it is a scrambled ES, descrambling the scrambled ES.

First, the tp_header decoder 33, the ad_field decoder 34, the PES_header decoder 38 and the synchronization and fetch controller 32 are process the transport stream received through the N buffers 31 by one byte at a clock. However, the tp_header decoder 33 may require many clocks only when PID's (Packet Identifications), which are packet identification information, are compared. Therefore, when it is assumed that only one PID is compared at a clock, N clocks will be required for N PID registers, and, if a ratio of transport bit rate to a decoding operation clock is $\alpha$, a number of required buffer is N×$\alpha$. If the operation clock is 27 MHZ and input bit rate is 72 Mbps, a number of the buffer 31 is N×⅓. Accordingly, when N=32, a number of buffer of 10 is enough. If all PID's are compared at a clock, a required buffer size will be 0. That is, no buffer is required. Therefore, a size of hardware required for one PID comparison and a hardware from buffers are compared to a hardware for 32 PID comparison, to minimize a hardware cost by selecting a hardware of a smaller size or an intermediate size.

The synchronization and fetch controller 32 examines synchronization byte of the transport stream, and presents data as much as required, if received a request from other decoding module or memory interface. Therefore, upon starting of parsing for the transport stream, the synchronization and fetch controller 32 informs a starting of decoding to the tp_header decoder 33 after finding a synchronization byte. The tp_header decoder 33 compares the PID (Packet Identification), which is a packet identification information, to individual bit stream, to filter out designated packets only, and executes operation of the ad_field decoder 34, the PES_header decoder 38, the descrambler 35 or the memory interface 37 according to information on the packet being ad_field, PES_header, or scrambled. If there is an ad_field present to receive an execution signal from the tp_header decoder 33, the ad_field decoder 34 extracts the PCR, and executes the descrambler 35, the PES_header decoder 38, the memory interface 37 according to information detected at the tp_header decoder 33. Upon reception of an execution signal from the tp_header decoder 33 or the ad_field decoder 34, the PES_header decoder 38 extracts a PTS (Presentation Time Stamp) from the transport stream data and executes the memory interface 37. In case the stream is scrambled at a PES level, the PES_header decoder 38 executes the descrambler 35, and provides a control signal CS to the multiplexer 36, to recover the video/audio signals in a payload. In case the transport stream is scrambled at a tp level, the descrambler 35 receives an execution signal from the tp_header decoder 33, ad_field decoder 34, or PES_header decoder 38, demands a required data to the synchronization and fetch controller 32, and descrambles a received stream. If the transport stream is scrambled at a PES level, the descrambler 35 receives an execution signal from the tp_header decoder 33, the ad_field decoder 34, or the PES_header decoder 38, and demands a required data to the synchronization and fetch controller 32, and descrambles a received stream. The multiplexer 36 receives a control signal CS from the tp_header decoder 33, ad_field decoder 34, or descrambler 35 in case scrambled at the tp level, or the tp_header decoder 33, ad_field decoder 34, or PES_header decoder 38 in case scrambled at the PES level, and provides an external transport stream or a signal descrambled at the descrambler 36 to the memory interface 37 or the PES-header decoder 38. That is, since the transport stream may be scrambled at the tp level or the PES level, the PES_header decoder 38 receives an output from the descrambler 35 when scrambled at the tp level, and receives the external transport stream directly when scrambled at the PES level, for decoding therein. In order to store a finally descrambled data temporarily, the memory interface 37 provides a memory address or a control signal to outside of the memory interface 37. The memory interface 37 may be designed to transmit data directly to an external video or audio decoder. Thus, an external transport stream can be demultiplexed into packets and descrambled signals through the aforementioned execution steps, and can be presented as video/audio signals through the multiplexer 36, finally. And, after decoding the transport stream by a packet unit, the synchronization and fetch controller, the tp_header decoder 33, the ad_field decoder 34, the descrambler 35, the multiplexer 36 and the PES_header decoder 38 are initialized, for processing the next transport stream.

The device for demultiplexing a transport stream of the present invention as has been explained has the following advantages.

First, with all the blocks in the device connected to a common bus and a buffer control module provided separately, the hardware structure itself is simple and has a good logical division.

Second, since a particular decoder can be implemented by means of a software, a slight modification of the decoder, modifications on other decoders, addition of functions, or changes of structures can be made with easy.

Third, as the device for demultiplexing a transport stream of the present invention can conduct descrambling combined with TS parsing using buffers incomparably smaller than the background art buffers, design modification and variation is easy.

It will be apparent to those skilled in the art that various modifications and variations can be made in the device and method for demultiplexing a transport stream of the present invention without departing from the spirit or scope of the invention. Thus, it is intended that the present invention cover the modifications and variations of this invention provided they come within the scope of the appended claims and their equivalents.

What is claimed is:

1. A device for demultiplexing a transport stream, comprising:
   an N number of buffers for storing a received transport stream at a fixed bit rate;
   a synchronization and fetch controller for checking a synchronization byte of the transport stream from the N number of buffers;
   a first subdecoder for comparing a packet identification number of the transport stream to an individual bit stream of the packet under the control of the synchronization and fetch controller, for filtering designated packets only;
   a second subdecoder for extracting a program clock reference information of the transport stream under the control of the first subdecoder;
   a descrambler for recovering a scramble signal from payload information in the transport stream under the control of the first subdecoder or the second subdecoder;
   a multiplexer for multiplexing the transport stream or descrambled signal under the control of the first subdecoder and the second subdecoder;
   a third subdecoder for extracting a presentation time information of the transport stream or a stream from the multiplexer and providing a control signal to the multiplexer and the descrambler; and,
   a memory interface for interfacing, and temporarily storing video/audio signals or finally descrambled data from the multiplexer.

2. A device for demultiplexing a transport stream, comprising:
   a synchronization and fetch controller for checking a synchronization byte of a received transport stream;
   a first subdecoder for comparing a packet identification number of the transport stream to an individual bit stream of the packet under the control of the synchronization and fetch controller, for filtering designated packets only;
   a second subdecoder for extracting a program clock reference information of the transport stream under the control of the first subdecoder;
   a descrambler for recovering a scramble signal from payload information in the transport stream under the control of the first subdecoder or the second subdecoder;
   a multiplexer for multiplexing the transport stream or descrambled signal under the control of the first subdecoder and the second subdecoder; and,
   a third subdecoder for extracting a presentation time information of the transport stream or a stream from the multiplexer and providing a control signal to the multiplexer and the descrambler.

3. A device as claimed in claim 2, wherein the third subdecoder is adapted to receive an output from the descrambler in a case when scrambled at a transport stream level and to receive the received transport stream in a case when scrambled at a packet elementary stream level, for extracting the presentation time information.

4. A device as claimed in claim 2, further comprising a memory interface for temporarily storing video/audio signals or finally descrambled data from the multiplexer.

5. A method for demultiplexing a transport stream, comprising:
   (1) comparing a packet identification number of a transport stream to an individual bit stream of the packet after checking a synchronization byte of the transport stream, for extracting designated packets only;
   (2) extracting a program clock reference information of the transport stream and descrambling a scrambled signal from payload information in the transport stream packets according to information extracted in step (1);
   (3) multiplexing the transport stream or the descrambled signal according to information extracted in steps (1) and (2); and
   (4) extracting presentation time information of the transport stream or the multiplexed stream depending on characteristics of the scrambled signal and controlling the multiplexing.

6. The method as claimed in claim 5, wherein the synchronization byte is checked after buffering the transport stream if many clocks are required in comparing the packet identification information in step (1).

7. The method as claimed in claim 5, wherein extracting presentation time information further comprises one of receiving the descrambled signal in a case when scrambled at a transport stream level, and receiving the transport stream in a case when scrambled at a packet elementary stream level.

8. A method for demultiplexing a transport stream, comprising:
   (1) checking a synchronization byte after buffering the received transport stream and comparing a packet identification number of a transport stream to an individual bit stream of the packet, for extracting designated packets only;
   (2) extracting a program clock reference information of the transport stream and descrambling a scrambled signal from payload information in the transport stream packets according to information extracted in step (1);
   (3) multiplexing the transport stream or the descrambled signal according to information extracted in steps (1) and (2); and
   (4) extracting presentation time information of the transport stream or the multiplexed stream depending on characteristics of the scrambled signal and controlling the multiplexing.

9. The method as claimed in claim 8, wherein extracting presentation time information further comprises one of receiving the multiplexed stream in a case when scrambled at a transport stream level, or receiving the transport stream in a case when scrambled at a packet elementary stream level.

10. A device for demultiplexing a transport stream, comprising:
    at least one buffer coupled to store a transport stream;
    a synchronization controller coupled to receive the transport stream from the at least one buffer to determine a value of a synchronization byte of the transport stream;
    a first decoder, coupled to receive the transport stream from the at least buffer and select prescribed packets based on packet identification numbers, and to extract program clock reference data of the transport stream;
    a multiplexer coupled to receive and multiplex the packets of the transport stream selected by the first decoder; and
    a second decoder coupled to receive an output of the multiplexer and extract presentation time information of one of the transport stream and a stream from the multiplexer.

11. The device of claim 10, wherein the first and second decoders are controlled by the synchronization controller.

12. The device of claim 10, wherein the multiplexer receives a control signal from the second decoder, and output a recovered data signal.

13. The device of claim 12, wherein the recovered data signal is one of video data and audio data.

14. The device of claim 10, wherein the first decoder comprises a tp_header decoder, an ad_field decoder, a descrambler, and a memory interface, wherein the descrambler is configured to descramble a scrambled signal from payload information in the transport stream, and the memory interface is configured to interface and temporarily store video/audio signals or descrambled data from the multiplexer.

15. A method of demultiplexing a transport stream, comprising:
    selecting and extracting prescribed packets from a transport stream;
    descrambling a scrambled signal from a payload of the selected packets;
    multiplexing one of the transport stream and the descrambled signal according to a program clock reference signal of the transport stream to generate a multiplexed stream; and
    extracting presentation time information from one of the transport stream and the multiplexed stream according to characteristics of the scrambled signal.

16. The method of claim 15, wherein the step of selecting and extracting prescribed packets comprises checking a synchronization byte of the transport stream and comparing a packet identification number of the transport stream to an individual bit stream of the packet.

17. The method of claim 16, wherein the step of descrambling the scrambled signal further comprises extracting the a program clock reference signal.

18. The method of claim 17, further comprising buffering the transport stream before checking the synchronization byte.

19. The method of claim 17, wherein the step of extracting presentation time information further comprises one of receiving the descrambled signal in a case when scrambled at a transport stream level and receiving the transport stream in a case when scrambled at a packet elementary stream level.

20. A device for demultiplexing a transport stream, comprising:
    a synchronization controller to check a synchronization byte of a received transport stream;
    a first decoder to compare a packet identification number of the transport stream to an individual bit stream of the packet under the control of the synchronization controller, to filter designated packets;
    a second decoder to extract a program clock reference information of the transport stream under the control of the first decoder;
    a descrambler controlled by the first and second decoders to descramble a scrambled signal from payload information in the transport stream;
    a multiplexer controlled by the first and second decoders to multiplex one of the transport stream and the recovered signal; and
    a third decoder configured to extract presentation time information from one of the transport stream and an output stream of the multiplexer, and to provide a control signal to each of the multiplexer and the descrambler.

* * * * *